United States Patent
Modaresi

(10) Patent No.: US 7,657,601 B2
(45) Date of Patent: Feb. 2, 2010

(54) METHODS AND COMPUTER PROGRAMS FOR FORMULATING MESSAGING PLATFORM CAPACITY PROJECTIONS

(75) Inventor: Ray Modaresi, Suwanee, GA (US)

(73) Assignee: AT&T Intellectual Property, I,L.P., Reno, NV (US)

(*) Notice: Subject to any disclaimer, the term of this patent is extended or adjusted under 35 U.S.C. 154(b) by 531 days.

(21) Appl. No.: 11/322,643

(22) Filed: Dec. 30, 2005

(65) Prior Publication Data

US 2007/0156822 A1   Jul. 5, 2007

(51) Int. Cl.
  *G06F 15/16* (2006.01)
  *G06F 15/173* (2006.01)
  *G06F 9/44* (2006.01)
(52) U.S. Cl. .............. 709/206; 709/223; 709/224; 709/225; 717/104
(58) Field of Classification Search ............ 709/206, 709/200
  See application file for complete search history.

(56) References Cited

U.S. PATENT DOCUMENTS

| | | | |
|---|---|---|---|
| 6,578,068 B1 | 6/2003 | Bowman-Amuah | 709/203 |
| 6,606,744 B1 | 8/2003 | Mikurak | 717/174 |
| 6,615,166 B1 | 9/2003 | Guheen et al. | 703/27 |
| 6,615,253 B1 | 9/2003 | Bowman-Amuah | 709/219 |
| 6,708,205 B2 | 3/2004 | Sheldon et al. | 709/206 |
| 6,738,736 B1 | 5/2004 | Bond | 703/2 |
| 6,745,197 B2 | 6/2004 | McDonald | 707/102 |
| 6,816,904 B1 | 11/2004 | Ludwig et al. | 709/226 |
| 2002/0152305 A1* | 10/2002 | Jackson et al. | 709/224 |
| 2003/0018513 A1* | 1/2003 | Hoffman et al. | 705/10 |
| 2003/0050988 A1* | 3/2003 | Kucherawy | 709/207 |
| 2003/0172145 A1* | 9/2003 | Nguyen | 709/223 |
| 2004/0167967 A1* | 8/2004 | Bastian et al. | 709/206 |

* cited by examiner

*Primary Examiner*—George C Neurauter, Jr.
*Assistant Examiner*—Kishin G Belani
(74) *Attorney, Agent, or Firm*—Cantor Colburn LLP

(57) ABSTRACT

Computer-executable methods and programs for formulating a planning recommendation for a messaging platform. Mailbox data is received specifying a projected maximum number of mailboxes. Growth assumption data is received that specifies a change in average message size of messages. Traffic assumption data is received that identifies a portion of message traffic projected to occur during any recurring time interval for which message traffic has previously exceeded a threshold. Baseline data is received specifying maximum performance capabilities of the messaging platform. Messaging platform data is received specifying a quantity of messages accepted, stored, deleted, and/or retrieved. A planning recommendation is generated by applying an algorithm to the mailbox data, traffic and growth assumption data, baseline data, and messaging platform data. The planning recommendation is placed into a physically tangible, humanly discernible form by printing the recommendation, displaying the recommendation, or outputting the recommendation in audible form.

20 Claims, 5 Drawing Sheets

MESSAGING PLATFORM PLANNING RECOMMENDATION 111

| Server Groups 511 | Number Of Servers Presently Deployed 501 | First Planning Recommendation 503 | Add'l Servers Req'd – First Planning Recommendation 505 | Second Planning Recommendation 507 | Add'l Servers Req'd – Second Planning Recommendation 509 |
|---|---|---|---|---|---|
| MSS Servers 521 | 14 | 16 | 2 | 18 | 4 |
| Outbound MTA Servers 522 | 10 | 7 | -3 | 7 | -3 |
| Inbound MTA Servers 523 | 16 | 17 | 1 | 17 | 1 |
| Cache Servers 525 | 10 | 9 | -1 | 9 | -1 |
| ISD Servers 527 | 2 | 2 | 0 | 2 | 0 |
| Queue Servers 529 | 9 | 9 | 0 | 8 | -1 |
| WebEdge Servers 531 | 7 | 8 | 1 | 8 | 1 |
| POP Servers 533 | 9 | 2 | -7 | 2 | -7 |
| Total Projected Mailboxes at End of a Defined Time Period 534 | 4,500,000 | | | | |

TRAFFIC AND GROWTH ASSUMPTION DATA 103

| ASSUMPTION FIELD 201 | VALUE FIELD 203 |
|---|---|
| Overhead | 1.3 |
| Growth Factor to End of Time Period | 1.0 |
| Inbound Message Size Growth Factor to End of Time Period | 1.0 |
| Outbound Message Size Growth Factor to End of Time Period | 1.0 |
| Replica Traffic Overhead | 1.9 |
| Daily Traffic Considered to be Peak (Delivered to Local Mailboxes) | 9% |
| Daily Traffic Considered to be Peak (as Received From the Internet) | 8% |
| Current LDAP Database Size (Gigabits) | 4.5 |

*FIG. 2*

BASELINE PARAMETER DATA 105

| PARAMETER FIELD 301 | MAXIMUM PERFORMANCE CAPABILITY FIELD 303 | CURRENT PERFORMANCE FIELD 305 |
|---|---|---|
| MTA Baseline Messages/Second Inbound | 80.0 | 41.40 |
| MTA Baseline Messages/Second Outbound | 15.0 | 4.46 |
| Baseline Average Message Size for POP | 60 | 31.49 |
| Baseline Number of Retrievals and Deletions per Second | 100 | 34.25 |
| Baseline Connections per Second per CPU (Cache) | 395 | 352.38 |
| Baseline Number of Queue Threads | 246 | |
| WebEdge Number of Operations per Second per Server | 40 | 13.85 |
| Maximum Number of Provisioning Transactions per Second | 40 | 1.69 |
| Weighted Message Retrievals and Deletions per Second | 1051.28 | 948.35 |
| Weighted Message Retrievals per Second | 547.60 | |

*FIG. 3*

MESSAGING PLATFORM DATA 107

| PARAMETER FIELD 401 | VALUE FIELD 403 |
| --- | --- |
| Number of Mailboxes | 4,344,007 |
| Incoming Messages per Day per Mailbox | 5.22 |
| Number of Messages Remaining in Mailbox per Day per Mailbox | 2.61 |
| Number of POP Deletions per Day per Mailbox | 2.61 |
| Messages Deleted per Day | 11,357,678 |
| Messages Sent to Internet per Day | 3,849,128 |
| Messages Sent to Internet per Day per Mailbox | 0.89 |
| Messages Received from Internet per Day | 57,225,984 |
| Messages Received from Internet per Day per Mailbox | 13 |
| Messages Retrieved per Day | 15,271,927 |
| Messages Retrieved per Day per Mailbox | 4 |
| Messages to Local Delivery per Day | 22,674,545 |
| Messages to Queue per Day | 820,525 |
| Messages to Errors per Day | 200 |
| Messages Retrieved and Deleted per Day | 26,629,604 |
| Number of New and Deleted Accounts per Day | 24,146 |
| Number of Provisioning Requests per Day | 146,199 |
| Average WebEdge Logins per Day | 1,161,884 |
| Average WebEdge Logins per Day per Mailbox | 0.27 |
| Average WebEdge Operations per Day | 8,374,433 |
| Average WebEdge Operations per Day per Mailbox | 2 |
| Average Current BS Inbound Message Size per Day | 16 |
| Average Current BS Outbound Message Size per Day | 112 |
| Average Message Size per POP | 31.49 |
| Current Storage Required (48-Hour Time Period) | 1,647,454,806 |

*FIG. 4*

MESSAGING PLATFORM PLANNING RECOMMENDATION 111

| Server Groups 511 | Number Of Servers Presently Deployed 501 | First Planning Recommendation 503 | Add'l Servers Req'd – First Planning Recommendation 505 | Second Planning Recommendation 507 | Add'l Servers Req'd – Second Planning Recommendation 509 |
|---|---|---|---|---|---|
| MSS Servers 521 | 14 | 16 | 2 | 18 | 4 |
| Outbound MTA Servers 522 | 10 | 7 | -3 | 7 | -3 |
| Inbound MTA Servers 523 | 16 | 17 | 1 | 17 | 1 |
| Cache Servers 525 | 10 | 9 | -1 | 9 | -1 |
| ISD Servers 527 | 2 | 2 | 0 | 2 | 0 |
| Queue Servers 529 | 9 | 9 | 0 | 8 | -1 |
| WebEdge Servers 531 | 7 | 8 | 1 | 8 | 1 |
| POP Servers 533 | 9 | 2 | -7 | 2 | -7 |
| Total Projected Mailboxes at End of a Defined Time Period 534 | 4,500,000 | | | | |

METHODS AND COMPUTER PROGRAMS FOR FORMULATING MESSAGING PLATFORM CAPACITY PROJECTIONS

BACKGROUND OF THE INVENTION

The present invention relates generally to messaging platforms and, more particularly, to techniques for formulating messaging platform capacity projections.

Messaging platforms are capable of accepting, storing, forwarding, and delivering electronic messages representing voice, text, email, photographs, video, files, music, graphics, or various combinations thereof. Information specifying the identity of a message recipient is explicitly provided to the messaging platform. Once the messaging platform accepts a message from a sender, the messaging platform either stores the message until the message is delivered to the recipient, or forwards the message to another messaging platform where the message is stored until delivered. The messaging platform is typically implemented using groups of specialized servers organized according to functionality. Each group of servers is adapted to execute a specific set of functions, such as data caching, multimedia storage, or processing standard post office protocol (POP) email messages.

Managing the capacity of a messaging platform is a difficult and tedious process. Existing messaging platforms are called upon to handle ever-increasing amounts of email traffic, while the volume of multimedia messages that include video, graphics, photographs, or audio is also increasing. These factors place increased demands on messaging platforms, with the effect that a shortfall in capacity is oftentimes first observed as a reduction in performance. Yet, using system performance to perform capacity planning is an unacceptable approach. A well-designed capacity management method should anticipate future growth in messaging platform usage so as to avoid declines in system performance during periods when total platform capacity is approached or exceeded. What is needed is a technique for automatically projecting messaging platform capacity so as to provide a messaging platform having a substantially consistent level of performance in response to predicted platform usage conditions.

BRIEF SUMMARY OF THE INVENTION

Embodiments include computer-executable methods for formulating a planning recommendation for a messaging platform capable of accepting and storing electronic messages for delivery to one or more mailboxes. These methods comprise receiving mailbox data specifying a projected maximum number of mailboxes to be provided by the messaging platform. Growth assumption data is received that specifies a projected change in average message size of electronic messages accepted by the messaging platform over time. Traffic assumption data is received that identifies a portion of message traffic on the messaging platform projected to occur during any periodically recurring time interval for which message traffic has previously exceeded a predetermined threshold. Baseline data is received specifying at least one maximum performance capability of the messaging platform. Messaging platform data is received specifying any of: a quantity of incoming messages to be accepted by the messaging platform, a quantity of accepted messages to be stored by the messaging platform, a quantity of stored messages to be deleted by the messaging platform, and a quantity of stored messages to be retrieved by the messaging platform. A messaging platform planning recommendation is generated by applying an algorithm to the received mailbox data, the received traffic and growth assumption data, the received baseline data, and the received messaging platform data. The generated messaging platform planning recommendation is placed into a physically tangible, humanly discernible form by at least one of: printing the planning recommendation, displaying the planning recommendation on an electronic display mechanism, or outputting the planning recommendation in audible form.

Embodiments also include computer program products for establishing a trusted network. The computer program products include a storage medium readable by a processing circuit and storing instructions for execution by the processing circuit for facilitating a method of formulating a planning recommendation for a messaging platform capable of accepting and storing electronic messages for delivery to one or more mailboxes. This method comprises receiving mailbox data specifying a projected maximum number of mailboxes to be provided by the messaging platform. Growth assumption data is received that specifies a projected change in average message size of electronic messages accepted by the messaging platform over time. Traffic assumption data is received that identifies a portion of message traffic on the messaging platform projected to occur during any periodically recurring time interval for which message traffic has previously exceeded a predetermined threshold. Baseline data is received specifying at least one maximum performance capability of the messaging platform. Messaging platform data is received specifying any of: a quantity of incoming messages to be accepted by the messaging platform, a quantity of accepted messages to be stored by the messaging platform, a quantity of stored messages to be deleted by the messaging platform, and a quantity of stored messages to be retrieved by the messaging platform. A messaging platform planning recommendation is generated by applying an algorithm to the received mailbox data, the received traffic and growth assumption data, the received baseline data, and the received messaging platform data. The generated messaging platform planning recommendation is placed into a physically tangible, humanly discernible form by at least one of: printing the planning recommendation, displaying the planning recommendation on an electronic display mechanism, or outputting the planning recommendation in audible form.

Other systems, methods, and/or computer program products according to the embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIG. 2 is a diagram setting forth illustrative traffic and growth assumption data for use with the procedures of FIG. 1;

FIG. 3 is a diagram setting forth illustrative baseline parameter data for use with the procedures of FIG. 1;

FIG. 4 is a diagram setting forth illustrative messaging platform data for use with the procedures of FIG. 1; and FIG. 5 is a diagram setting forth an illustrative messaging platform planning recommendation generated by the procedures of FIG. 1.

Figure 1:
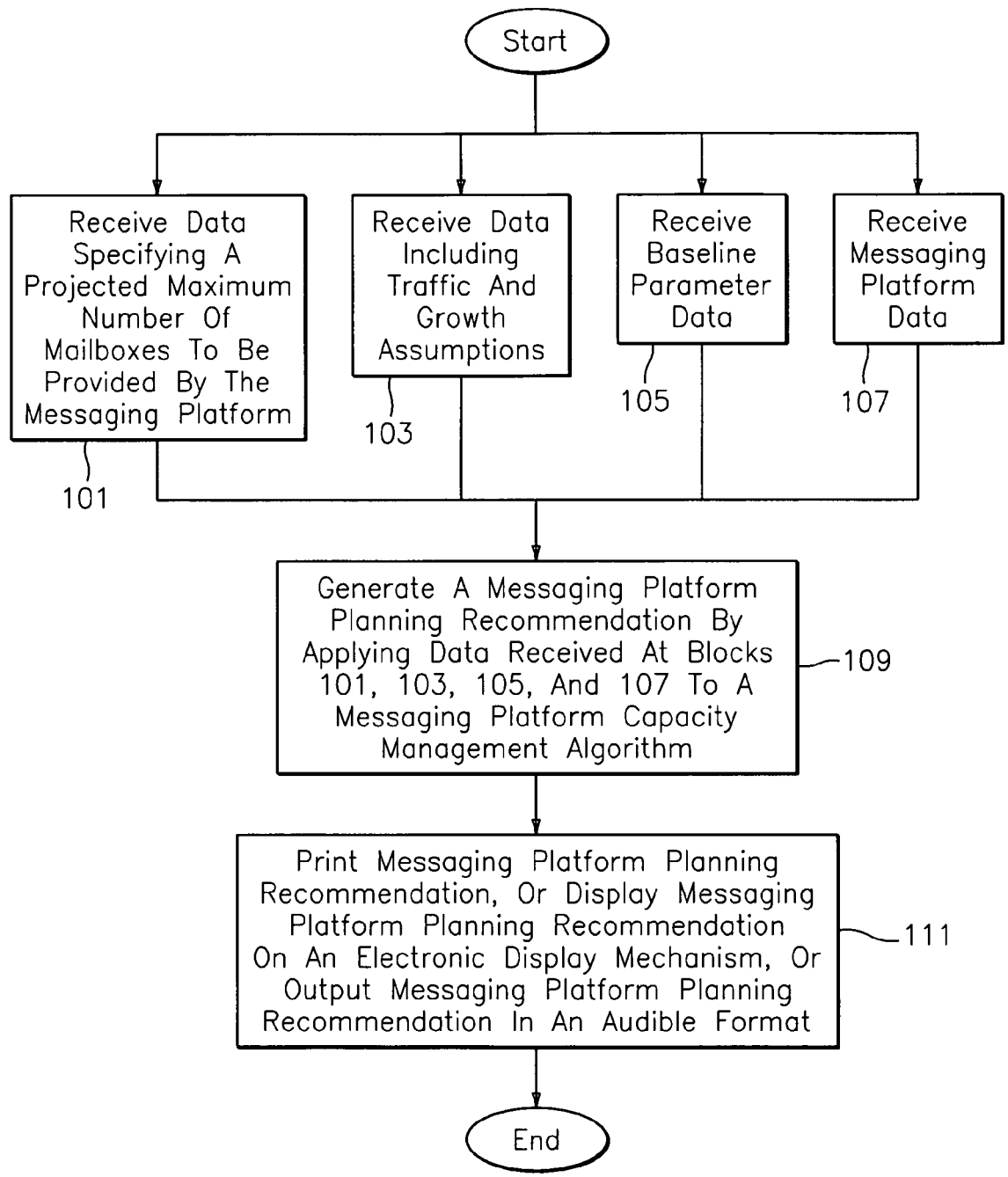
FIG. 1 is a flowchart setting forth methods for generating a messaging platform planning recommendation according to various illustrative embodiments.

The detailed description explains the preferred embodiments of the invention, together with advantages and features, by way of example with reference to the drawings.

DETAILED DESCRIPTION OF EXEMPLARY EMBODIMENTS

FIG. 1 is a flowchart setting forth computer-executable methods for formulating a messaging platform planning recommendation according to various illustrative embodiments. These methods are applicable to any electronic messaging platform capable of accepting, storing, and delivering one or more electronic messages. The electronic messages may represent voice, text, email, photographs, video, files, music, graphics, or various combinations thereof. As a preliminary matter, it should be noted that the operations of blocks 101, 103, 105, and 107 may be performed in any order. Moreover, two or more of the foregoing blocks may be performed concurrently.

At block 101, data is received specifying a projected maximum number of mailboxes to be provided by the messaging platform. This maximum number could specify a number of mailboxes to be provided upon initial deployment of the messaging platform, a maximum number of mailboxes needed within a predefined time period, a number of mailboxes to be provided upon expiration of the defined time period, or various combinations thereof. The methods of FIG. 1 are applicable when a new messaging platform is under development, and are also applicable when an existing messaging platform is to be expanded. If the methods of FIG. 1 are applied to migration of mailboxes from a first group of servers to a second group of servers, the maximum number of mailboxes could be determined with reference to the number of mailboxes that were provided by the first group of servers.

At block 103, data including at least one traffic assumption and at least one growth assumption is received. The growth assumption specifies a projected change in an average message size handled by the messaging platform from commencement to expiration of a defined time period. The messaging platform includes a computer-readable storage medium for storing messages. Accordingly, the average message size could, but need not, be determined by measuring an amount of storage space occupied by a plurality of messages on the storage medium and dividing this amount by the number of messages included in the plurality of messages. Illustratively, projected changes in average message size are based upon past measurements of average message size taken over days, weeks, or months.

The growth assumption could, but need not, be expressed in the form of a normalized growth factor that specifies an amount of message size growth projected to occur during a defined time period. For example, a growth factor of 1.0 represents no change in the average size of messages handled by the messaging platform during the defined time period, whereas a growth factor of 2.0 indicates a projected increase of 200% in the average size of messages handled by the messaging platform. One or more of these growth factors could be expressed in terms of a percentage instead of, or in addition to, a normalized value. As a practical matter, a growth factor of 1.00 would apply to migration of mailboxes from a first server to a second server, whereas a growth factor of 2.0 would apply to a messaging platform where average message size is expected to grow by 200% over the defined time period.

The traffic assumption is based on a recognition that some messages are sent during slow periods when messaging platform traffic is relatively low, whereas other messages are sent during busier periods. The traffic assumption identifies a percentage of portion of total message traffic that is expected to take place during periods when traffic approaches peak levels. The periods when traffic approaches peak levels are determined by taking message traffic measurements over days, weeks, or months to identify any periodically recurring time intervals when message traffic exceeds a predetermined threshold.

Baseline parameter data is received at block 105. Baseline parameter data sets forth a maximum achievable performance capability for each of a plurality of functions implemented by the messaging platform. Maximum achievable performance is derived from known operational characteristics of at least one server used to implement the messaging platform, such as a maximum clocking speed of one or more processing mechanisms associated with the at least one server, a maximum memory capacity of one or more computer-readable data storage drives associated with the at least one server, a maximum write access time for the one or more computer-readable data storage drives, a maximum read access time for the one or more computer-readable data storage drives, or a maximum data transfer speed of a communications port associated with the at least one server.

A messaging platform is typically implemented using groups of specialized servers organized according to functionality. Each group of servers is adapted to execute a specific set of functions, such as message transport, message storage, caching, multimedia storage, or processing standard post office protocol (POP) email messages. These functions also include retrieving messages, deleting messages, queuing messages, and performing provisioning transactions. Accordingly, baseline parameter data may include any of a maximum number of inbound messages which the messaging platform is capable of receiving during a time interval, a maximum number of outbound messages which the messaging platform is capable of sending during the time interval, a maximum number of messages which the messaging platform is capable of retrieving during the time interval, and a maximum number of messages which the messaging platform is capable of deleting during the time interval.

At block 107, messaging platform data is received. Messaging platform data includes information relating to any of: a quantity of incoming messages that are to be accepted, a quantity of accepted messages that are to be stored, a quantity of stored messages that are to be deleted, and a quantity of stored messages that are to be retrieved. More specifically, messaging platform data includes at least one of: (a) a total number of incoming messages expected to be received by the platform over a defined time period, (b) a total number of messages remaining in all mailboxes on the platform upon expiration of the time period, (c) a total number of messages expected to be deleted during the time period, (d) a total number of messages expected to be retrieved during the time period, and (e) a total amount of memory required to store messages during the time period. Optionally, messaging platform data may include additional information relating to at least one of message receipt, delivery, or processing. Illustratively, such additional data specifies a total number of mailboxes presently provided by the messaging platform, a number of messages expected to be sent to the Internet during the time period, and a number of messages projected to be received from the Internet during the time period.

After the operations of blocks 101, 103, 105, and 107 have been performed, a messaging platform planning recommendation is generated at block 109. The planning recommendation is generated by applying the received data of blocks 101, 103, 105, and 107 to a messaging platform capacity management algorithm. This algorithm utilizes a mathematical relationship which expresses the planning recommendation as a function of the received data. The function could, but need not, be implemented using a spreadsheet program such as Excel or Lotus. Preferably, the mathematical relationship specifies at least one of a linear or quadratic combination of the data received at any of blocks 101, 103, 105, and 107.

After the messaging platform planning recommendation is generated, the recommendation is placed into a physically tangible, user discernible format (block 109). For example, the recommendation can be printed, displayed on an electronic display mechanism, or outputted in audible form. The planning recommendation specifies the total number of servers required to implement a messaging platform in accordance with the input data accepted at blocks 101, 103, 105, and 107. Optionally, the planning recommendation may specify total numbers of servers required in each of a plurality of server groups. As stated above, each of the server groups is adapted to execute a specific set of functions, such as message transport, message storage, caching, multimedia storage, or processing standard post office protocol (POP) email messages. Optionally, the planning recommendation may specify total numbers of servers presently deployed in each of the plurality of server groups.

The messaging platform capacity management algorithm applied at block 109 may, but need not, be developed in accordance with the following considerations. For simple mail transfer protocol (SMTP) email message traffic, one may assume an average of 3.3 inbound messages coming into a messaging platform for every one outbound message leaving the messaging platform. This assumption is applicable in situations where a high percentage of incoming junk mail (spam) is expected. For an illustrative messaging platform that is capable of processing millions of SMTP transactions per day (inbound and outbound), the following formulas may be employed to calculate per second message transport agent (MTA) rates. These formulas are applicable if no distinction is made between inbound and outbound SMTP traffic: (Messages sent to Internet)+(Messages from Internet)=(Total number of SMTP messages per day/24/3600)=Average number of messages per second. Assume that the average number of messages per second is 168. Then the total number of SMTP messages per day multiplied by 15% and divided by 3600 gives the number of peak messages per second (in the present example, 602.7 or, rounding, 603). Peak messages have a multiplier of 15% as determined over a 4-hour peak throughput period (i.e., 60% of all traffic is concentrated within 4 hours).

In situations where a new messaging platform is to be deployed, it is sometimes advantageous to differentiate and split SMTP traffic between dedicated inbound and outbound MTA servers. In these situations, inbound traffic and outbound traffic are each calculated individually: Inbound=(Messages from Internet). Inbound/24/3600=Average number of inbound messages per second. Assume, for example, an average number of inbound messages per second of 131. Then (Messages from Internet)*15%/3600=peak hour inbound messages per second=471 (in this example). Outbound=(Messages sent to Internet). Outbound/24/3600=(Average outbound messages per second)=(assume 37). (Messages sent to Internet)*15%/3600=Peak hour outbound messages per second=132 (in this example).

In order to estimate the number of MTA servers required to implement a messaging platform, a weighted baseline may be formulated as: (MTA baseline messages per second)*(Baseline average size in KB)=Total KB per second. Then, total KB per second/(Average current outbound message size*outbound message size growth estimate)=messages per second outbound per CPU relocation sizing baseline. Total KB per second/(Average current inbound message size*inbound message size growth estimate)=messages per second inbound per CPU relocation sizing baseline. Also, the (Actual available relocation outbound CPU)*(Messages per second outbound per CPU relocation sizing baseline)=Outbound Messages per second throughput sizing maximum. Moreover, (Actual available relocation inbound CPU)*Messages per second inbound per CPU relocation sizing baseline) =Inbound messages per second throughout sizing maximum. This yields ((peak hour outbound messages per second/outbound messages per second throughput sizing maximum)*(Mailbox growth estimate)=number of Outbound MTA servers required; and ((peak hour inbound messages per second/inbound messages per second throughput sizing maximum) *(Mailbox growth estimate)=number of Inbound MTA CPU servers required. High availability considerations at peak capacity may call for an increase in the foregoing server estimate by one or more to assure messaging platform operation in case of a server failure.

Estimating the number of required POP servers may, but need not, be performed with reference to the following formulas. As many as 80% of Post Office Protocol (POP) connections in a typical messaging platform are empty. This places very little load on the platform, and is not considered significant for platform sizing. However, the primary concerns with POP traffic are retrievals and deletions. For traffic sizing considerations, all retrieved messages are calculated by matching them with deletions, even though deletions typically accompany only 77% of retrievals. Accordingly, the formulas are (Messages retrieved)/24/3600=average POPs per second. (Messages retrieved)*15%/3600=peak POPs per second. Then (Retrievals per second)*(Average KB size) =POP baseline KB per second per CPU; and ((POP baseline KB per second per CPU*average inbound message size as a percentage of 45 KB)*Estimated inbound message growth) =POP estimated KB per second per CPU. Also, Usable CPU*message POP estimate per CPU=Retrievals and Deletions per second maximum per server. Finally, ((Current peak hour message retrievals)*(Retrievals and deletions per second maximum per server)*(end of year growth projection) =Number of POP servers required. As was the case with the MTA server estimate described above, high availability considerations at peak capacity may call for an increase in the foregoing POP server estimate by one or more to assure messaging platform operation in case of a server failure.

FIG. 2 sets forth an illustrative set of traffic and growth assumption data 103 for use with the procedures of FIG. 1. Each of a plurality of assumptions in assumption field 201 is associated with a corresponding value in value field 203. The assumptions in assumption field 201 include at least one traffic assumption specifying a percentage of total message traffic expected to take place during any periodically recurring time interval for which traffic exceeds a predetermined threshold. This percentage, set forth in value field 203, is illustratively derived from past messaging platform traffic measurements.

The assumptions in assumption field 201 also include at least one growth assumption specifying a projected change in average message size handled by the messaging platform from commencement to expiration of a defined time period. The projected change, specified in value field 203, may or may not be derived from past messaging platform measurements. In the example of FIG. 2, the growth assumptions are expressed in the form of a normalized growth factor that specifies an amount of message size growth projected to occur during a defined time period. As stated above, a growth factor of 1.0 represents no growth in average message size during the defined time period, whereas a growth factor of 2.0 indicates a projected growth of 200%. A growth factor of 1.00 applies to migration of mailboxes from an old set of servers to a new set of servers, whereas a growth factor of 2.0 applies to a messaging platform wherein average message size is expected to grow by 200% over the defined time period. Assumption field 201 and value field 203 illustratively set forth a current lightweight directory access protocol (LDAP) database size in gigabits. LDAP is a software protocol which enables organizations, email destinations, domain names, and hardware resources to be located on the messaging platform.

FIG. 3 is a diagram setting forth illustrative baseline parameter data 105 for use with the procedures of FIG. 1. Each of a plurality of baseline parameters in parameter field 301 is associated with a corresponding maximum performance capability in maximum performance capability field 303 and a corresponding current performance in current performance field 305. Baseline parameters specify performance capabilities for each of a plurality of functions implemented by the messaging platform. These functions include any of: a number of inbound messages received per second, a number of outbound messages sent per second, an average size of post office protocol (POP) messages handled by the messaging platform, a number of message retrievals and deletions per second, a number of connections per second per CPU (central processing unit), a number of queue threads in existence, a number of operations performed per second for each WebEdge server in the messaging platform, a maximum number of provisioning transactions per second, a weighted number of message retrievals and deletions per second, and a weighted number of message retrievals per second. These numbers can be weighted by generating artificial loads for the WebEdge servers under laboratory or test conditions until the WebEdge servers are running at maximum capacity.

Referring to parameter field 301, the first illustrative baseline parameter sets forth a number of inbound message transport agent (MTA) messages per second. This parameter is associated with a maximum performance capacity of 80.0 in maximum performance capacity field 303, and with a current performance of 41.40 in current performance field 305. Accordingly, the current number of inbound MTA messages per second is 41.40, and the maximum number of inbound MTA messages that the messaging platform is equipped to process every second is 80.0.

FIG. 4 is a diagram setting forth illustrative messaging platform data 107 for use with the procedures of FIG. 1. Each of a plurality of messaging platform parameters in parameter field 401 is associated with a corresponding value in value field 403. Messaging platform data includes information specifying any of: (a) a quantity of incoming messages that are to be accepted, (b) a quantity of accepted messages that are to be stored, (c) a quantity of stored messages that are to be deleted, (d) a quantity of stored messages that are to be retrieved, and (e) other data relating to messaging platform performance. In the example of FIG. 4, messaging platform data 107 specifies a quantity of mailboxes provided by the messaging platform, a quantity of incoming messages per day per mailbox, a quantity of messages remaining in a mailbox per day per mailbox, a quantity of post office protocol (POP) message deletions per day, a quantity of messages deleted per day, a quantity of messages sent to the Internet per day, a quantity of message received from the Internet per day, and various additional data items relating to messaging platform performance.

FIG. 5 is a diagram setting forth an illustrative messaging platform planning recommendation 111 generated by the procedures of FIG. 1. Messaging platform planning recommendation 111 is shown as a computer-generated printout. However, it is not required to provide messaging platform planning recommendation 111 as a printout, as the recommendation could be provided in any physically tangible, user discernible format. For example, the recommendation could be displayed on an electronic display mechanism, outputted in audible form, or outputted to a computer-readable storage device.

Independent of the format or formats used to express planning recommendation 111, the planning recommendation specifies the total number of servers required to implement a messaging platform in accordance with input data accepted at blocks 101, 103, 105, and 107 of FIG. 1. In situations where a messaging platform uses groups of specialized servers organized according to functionality, planning recommendation 111 specifies the total numbers of servers required in each of a plurality of server groups 511.

Planning recommendation 111 could, but need not, include a plurality of different recommendations wherein each of respective recommendations is based upon a corresponding mathematical algorithm of a plurality of algorithms applied at block 109 (FIG. 1). In the example of FIG. 5, planning recommendation 111 includes a first planning recommendation 503 and a second planning recommendation 507. Illustratively, first planning recommendation 503 could be based upon a first mathematical algorithm that formulates a planning recommendation designed to provide reliable messaging services throughout a first time period having a first expected growth rate. Second planning recommendation 507 could be based upon a second mathematical algorithm that formulates a planning recommendation designed to provide reliable messaging services throughout a second time period longer than the first time period, and having a second growth rate greater than the first growth rate.

First and second planning recommendations 503, 507 apply to a messaging platform which utilizes a plurality of specialized servers organized into server groups 511. Each individual server group in server groups 511 is adapted to execute a specific set of functions, such as message storage, message transport, caching, queuing, communicating with the Internet, storing multimedia data, or processing standard post office protocol (POP) email messages. For each individual server group in server groups 511, first planning recommendation 503 sets forth a recommended number of servers to be employed in the server group as determined by a first mathematical algorithm. Likewise, for each individual server group in server groups 511, second planning recommendation 507 sets forth a recommended number of servers to be employed in the server group as determined by a second mathematical algorithm. Illustratively, server groups 511 include message store (MSS) servers 521, outbound message transport agent (MTA) servers 522, inbound MTA servers 523, cache servers 525, Internet service directory (ISD) servers 527, queue servers 529, WebEdge servers 531, and post office protocol (POP) servers 533.

The illustrative planning recommendation 111 of FIG. 5 includes a number of servers presently deployed 501 in each of the server groups 511, thereby providing a convenient point of reference for the messaging platform as it currently exists. A total number of projected mailboxes at the end of a defined time period 534 is included in planning recommendation 111, so as to enable comparison of a plurality of planning recommendations each based upon a different number of projected mailboxes. Also, for each server group of server groups 511, planning recommendation 111 specifies a number of additional servers 505 required to implement the first planning recommendation, and a number of additional servers 509 required to implement the second planning recommendation. For example, consider MSS servers 521. At present, the messaging platform includes 14 MSS servers 521. First planning recommendation 503 calls for 16 MSS servers 521. Accordingly, the number of additional servers 505 required to implement the first planning recommendation is 2. By contrast, second planning recommendation 507 calls for 18 MSS servers 521. Since the existing messaging platform uses 14 MSS servers 521, second planning recommendation 507 requires 4 additional servers.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for formulating a planning recommendation for a messaging platform capable of accepting and storing electronic messages for delivery to one or more mailboxes, the method comprising:
   receiving mailbox data specifying a projected maximum number of mailboxes to be provided by the messaging platform;
   receiving growth assumption data specifying a projected change in average message size of electronic messages accepted by the messaging platform over time;
   receiving traffic assumption data identifying a portion of message traffic on the messaging platform projected to occur during any periodically recurring time interval for which message traffic has previously exceeded a predetermined threshold;
   receiving baseline data specifying at least one maximum performance capability of the messaging platform;
   receiving messaging platform data specifying any of: a quantity of incoming messages to be accepted by the messaging platform, a quantity of accepted messages to be stored by the messaging platform, a quantity of stored messages to be deleted by the messaging platform, and a quantity of stored messages to be retrieved by the messaging platform;
   generating, by the computer, two messaging platform planning recommendations by applying algorithms to the received mailbox data, the received traffic and growth assumption data, the received baseline data, and the received messaging platform data, a first messaging platform planning recommendation being based upon a first mathematical algorithm that formulates a planning recommendation designed to provide reliable messaging services throughout a first time period having a first expected growth rate, a second messaging platform planning recommendation being based upon a second mathematical algorithm that formulates a planning recommendation designed to provide reliable messaging services throughout a second time period longer than the first time period, and having a second expected growth rate greater than the first expected growth rate; and
   placing the generated messaging platform planning recommendations into a humanly discernible form by at least one of: printing the planning recommendations, displaying the planning recommendations on an electronic display mechanism, or outputting the planning recommendations in audible form.

2. The method of claim 1 wherein the projected maximum number of mailboxes specifies at least one of: a quantity of mailboxes to be provided upon initial deployment of the messaging platform, a quantity of mailboxes needed within a predefined time period, or a quantity of mailboxes to be provided upon expiration of a predefined time period.

3. The method of claim 1 wherein the projected change in average message size of electronic messages is determined by measuring an amount of messaging platform storage space occupied by a plurality of electronic messages accepted by the messaging platform and dividing the amount by a total number of electronic messages included in the plurality of messages.

4. The method of claim 1 wherein the traffic assumption data is gathered by taking message traffic measurements over an extended period of time comprising at least two days to identify any periodically recurring time interval shorter than the extended period of time for which message traffic exceeds a predetermined threshold.

5. The method of claim 1 wherein the baseline parameter data is derived from an operational characteristic of at least one server used to implement the messaging platform, and the operational characteristic includes at least one of: a maximum clocking speed of one or more processing mechanisms associated with the at least one server, a maximum memory capacity of one or more computer-readable data storage drives associated with the at least one server, a maximum write access time for the one or more computer-readable data storage drives, a maximum read access time for the one or more computer-readable data storage drives, or a maximum data transfer speed of a communications port associated with the at least one server.

6. The method of claim 1 wherein the messaging platform data further specifies at least one of: a total number of mailboxes presently provided by the messaging platform, a number of electronic messages projected to be sent from the messaging platform to the Internet, and a number of electronic messages projected to be accepted by the messaging platform from the Internet.

7. The method of claim 1 wherein generating messaging platform planning recommendations by applying an algorithm is implemented using a spreadsheet program.

8. The method of claim 1 wherein generating messaging platform planning recommendations by applying an algorithm is implemented using a mathematical relationship which is a function of the received mailbox data, the received traffic and growth assumption data, the received baseline data, and the received messaging platform data.

9. The method of claim 8 wherein the mathematical relationship is a formula comprising a linear or a quadratic combination of two or more of: the received mailbox data, the received traffic and growth assumption data, the received baseline data, and the received messaging platform data.

10. The method of claim 1 wherein the messaging platform planning recommendations specify a respective total number of servers required for each of a corresponding plurality of server groups in the messaging platform.

11. A computer program product for establishing a trusted network, the computer program product comprising:
a storage medium readable by a processing circuit and storing instructions for execution by the processing circuit for facilitating a method of formulating a planning recommendation for a messaging platform capable of accepting and storing electronic messages for delivery to one or more mailboxes, the method comprising:
receiving mailbox data specifying a projected maximum number of mailboxes to be provided by the messaging platform;
receiving growth assumption data specifying a projected change in average message size of electronic messages accepted by the messaging platform over time;
receiving traffic assumption data identifying a portion of message traffic on the messaging platform projected to occur during any periodically recurring time interval for which message traffic has previously exceeded a predetermined threshold;
receiving baseline data specifying at least one maximum performance capability of the messaging platform;
receiving messaging platform data specifying any of: a quantity of incoming messages to be accepted by the messaging platform, a quantity of accepted messages to be stored by the messaging platform, a quantity of stored messages to be deleted by the messaging platform, and a quantity of stored messages to be retrieved by the messaging platform;
generating messaging platform planning recommendations by applying algorithms to the received mailbox data, the received traffic and growth assumption data, the received baseline data, and the received messaging platform data, a first messaging platform planning recommendation being based upon a first mathematical algorithm that formulates a planning recommendation designed to provide reliable messaging services throughout a first time period having a first expected growth rate, a second messaging platform planning recommendation being based upon a second mathematical algorithm that formulates a planning recommendation designed to provide reliable messaging services throughout a second time period longer than the first time period, and having a second expected growth rate greater than the first expected growth rate; and
placing the generated messaging platform planning recommendations into a humanly discernible form by at least one of: printing the planning recommendations, displaying the planning recommendations on an electronic display mechanism, or outputting the planning recommendations in audible form.

12. The computer program product of claim 11 wherein the projected maximum number of mailboxes specifies at least one of: a quantity of mailboxes to be provided upon initial deployment of the messaging platform, a quantity of mailboxes needed within a predefined time period, or a quantity of mailboxes to be provided upon expiration of a predefined time period.

13. The computer program product of claim 11 wherein the projected change in average message size of electronic messages is determined by measuring an amount of messaging platform storage space occupied by a plurality of electronic messages accepted by the messaging platform and dividing the amount by a total number of electronic messages included in the plurality of messages.

14. The computer program product of claim 11 wherein the traffic assumption data is gathered by taking message traffic measurements over an extended period of time comprising at least two days to identify any periodically recurring time interval shorter than the extended period of time for which message traffic exceeds a predetermined threshold.

15. The computer program product of claim 11 wherein the baseline parameter data is derived from an operational characteristic of at least one server used to implement the messaging platform, and the operational characteristic includes at least one of: a maximum clocking speed of one or more processing mechanisms associated with the at least one server, a maximum memory capacity of one or more computer-readable data storage drives associated with the at least one server, a maximum write access time for the one or more computer-readable data storage drives, a maximum read access time for the one or more computer-readable data storage drives, or a maximum data transfer speed of a communications port associated with the at least one server.

16. The computer program product of claim 11 wherein the messaging platform data further specifies at least one of: a total number of mailboxes presently provided by the messaging platform, a number of electronic messages projected to be sent from the messaging platform to the Internet, and a number of electronic messages projected to be accepted by the messaging platform from the Internet.

17. The computer program product of claim 11 wherein generating messaging platform planning recommendations by applying an algorithm is implemented using a spreadsheet program.

18. The computer program product of claim 11 wherein generating messaging platform planning recommendations by applying an algorithm is implemented using a mathematical relationship which is a function of the received mailbox data, the received traffic and growth assumption data, the received baseline data, and the received messaging platform data.

19. The computer program product of claim 18 wherein the mathematical relationship is a formula comprising a linear or a quadratic combination of two or more of: the received mailbox data, the received traffic and growth assumption data, the received baseline data, and the received messaging platform data.

20. The computer program product of claim 11 wherein the messaging platform planning recommendations specify a respective total number of servers required for each of a corresponding plurality of server groups in the messaging platform.

* * * * *